(12) United States Patent
Kamezaki

(10) Patent No.: US 12,269,499 B2
(45) Date of Patent: Apr. 8, 2025

(54) VEHICLE NOTIFICATION DEVICE, VEHICLE NOTIFICATION SYSTEM, AND VEHICLE NOTIFICATION METHOD

(71) Applicant: TOYOTA JIDOSHA KABUSHIKI KAISHA, Aichi-ken (JP)

(72) Inventor: Yasuyuki Kamezaki, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 16 days.

(21) Appl. No.: 18/300,392

(22) Filed: Apr. 14, 2023

(65) Prior Publication Data

US 2023/0406337 A1  Dec. 21, 2023

(30) Foreign Application Priority Data

Jun. 15, 2022 (JP) ................................ 2022-096648

(51) Int. Cl.
  *B60W 50/14* (2020.01)
  *B60W 40/08* (2012.01)
  *B60W 50/04* (2006.01)

(52) U.S. Cl.
  CPC ............ *B60W 50/14* (2013.01); *B60W 40/08* (2013.01); *B60W 50/045* (2013.01); *B60W 2050/146* (2013.01); *B60W 2556/45* (2020.02)

(58) Field of Classification Search
  CPC .... B60W 50/14; B60W 40/08; B60W 50/045; B60W 2556/45; B60W 2050/146
  USPC ....................................................... 340/425.5
  See application file for complete search history.

(56) References Cited

U.S. PATENT DOCUMENTS

| 10,532,746 B2* | 1/2020 | Park ...................... B60W 30/12 |
| 10,768,617 B2* | 9/2020 | Igarashi ................ B60W 50/14 |
| 11,869,089 B1* | 1/2024 | Black ..................... G07C 5/085 |
| 2009/0326753 A1* | 12/2009 | Chen ......................... G09B 9/04 |
| | | 701/31.4 |
| 2014/0195106 A1* | 7/2014 | McQuade .............. G09B 9/052 |
| | | 701/33.9 |
| 2017/0315556 A1* | 11/2017 | Mimura ............... G05D 1/0061 |
| 2017/0349182 A1* | 12/2017 | Cordova ............... H04W 4/027 |

(Continued)

FOREIGN PATENT DOCUMENTS

| JP | 2014071621 A | 4/2014 |
| JP | 2019012481 A | 1/2019 |
| JP | 2020095403 A | 6/2020 |

*Primary Examiner* — Zhen Y Wu
(74) *Attorney, Agent, or Firm* — HAUPTMAN HAM, LLP

(57) ABSTRACT

A vehicle notification device includes: a mode setting unit that sets a mode of a vehicle to either a first mode and a second mode based on mode setting information; an acquisition unit that acquires a driving diagnosis result; a classification unit that classifies the driving diagnosis result into a first diagnosis result or a second diagnosis result based on content of the driving diagnosis result; and a notification device that notifies a target occupant of the vehicle of information representing the driving diagnosis result when the vehicle is in the first mode, notifying the target occupant of information representing the first diagnosis result when the vehicle is in the second mode and the first diagnosis result is acquired, and notifying the target occupant of specific information instead of information representing the second diagnosis result when the vehicle is in the second mode and the second diagnosis result is acquired.

7 Claims, 13 Drawing Sheets

(56) References Cited

U.S. PATENT DOCUMENTS

| | | | |
|---|---|---|---|
| 2018/0052458 A1* | 2/2018 | Tsuji | B60W 30/143 |
| 2018/0093676 A1* | 4/2018 | Emura | B60R 16/02 |
| 2018/0126992 A1* | 5/2018 | Lu | B60W 10/12 |
| 2018/0284766 A1* | 10/2018 | Minegishi | B60W 50/12 |
| 2019/0016344 A1* | 1/2019 | Ehmann | B60W 50/0098 |
| 2020/0108869 A1* | 4/2020 | You | H04W 4/46 |
| 2020/0184500 A1 | 6/2020 | Yuyama et al. | |
| 2022/0005356 A1* | 1/2022 | Kim | B60Q 1/5037 |
| 2022/0070638 A1* | 3/2022 | Takabatake | B60K 35/00 |
| 2022/0289215 A1* | 9/2022 | Kamezaki | B60W 40/09 |
| 2023/0132673 A1* | 5/2023 | Russo | B60W 40/09 705/4 |

* cited by examiner

| FIRST DIAGNOSIS RESULT | SECOND DIAGNOSIS RESULT |
|---|---|
| SMOOTH ACCELERATOR PEDAL OPERATION | ABRUPT ACCELERATOR PEDAL OPERATION |
| GENTLE BRAKE PEDAL OPERATION | ABRUPT BRAKE PEDAL OPERATION |
| SMOOTH STEERING OPERATION | ABRUPT STEERING OPERATION |
|  | ACTIVATION OF PCS |
|  | SPEED LIMIT VIOLATION |
|  |  |

VEHICLE NOTIFICATION DEVICE, VEHICLE NOTIFICATION SYSTEM, AND VEHICLE NOTIFICATION METHOD

CROSS-REFERENCE TO RELATED APPLICATION

This application claims priority to Japanese Patent Application No. 2022-096648 filed on Jun. 15, 2022, incorporated herein by reference in its entirety.

BACKGROUND

1. Technical Field

The present disclosure relates to a vehicle notification device, a vehicle notification system, and a vehicle notification method.

2. Description of Related Art

Japanese Unexamined Patent Application Publication No. 2014-071621 (JP 2014-071621 A) discloses a driving diagnosis management system capable of reducing the burden on a manager when performing a real-time driving diagnosis of driving by a driver of a vehicle.

SUMMARY

JP 2014-071621 A has room for improvement regarding the notification mode of the result of the real-time driving diagnosis by a notification device.

In view of the above fact, an object of the present disclosure is to provide a vehicle notification device, a vehicle notification system, and a vehicle notification method capable of notifying a target occupant of a driving diagnosis result in a manner preferable to the target occupant.

A vehicle notification device according to at least one embodiment includes: a mode setting unit provided in a vehicle for setting a mode of the vehicle to one of a first mode and a second mode based on predetermined mode setting information; an acquisition unit provided in the vehicle for acquiring a driving diagnosis result of the vehicle; a classification unit that classifies the driving diagnosis result into a first diagnosis result or a second diagnosis result based on content of the driving diagnosis result; and a notification device provided in the vehicle for notifying, when the vehicle is in the first mode, a target occupant of the vehicle of information representing the driving diagnosis result acquired by the acquisition unit, notifying the target occupant of information representing the first diagnosis result when the vehicle is in the second mode and the acquisition unit acquires the first diagnosis result, and notifying the target occupant of specific information instead of information representing the second diagnosis result when the vehicle is in the second mode and the acquisition unit acquires the second diagnosis result.

In the vehicle notification device according to at least one embodiment, when the vehicle is in the first mode, the notification device notifies the target occupant of the vehicle of the information representing the driving diagnosis result acquired by the acquisition unit. That is, the notification device notifies the target occupant of the information representing the driving diagnosis result regardless of whether the acquisition unit acquires the first diagnosis result or the second diagnosis result. When the vehicle is in the second mode and the acquisition unit acquires the first diagnosis result, the notification device notifies the target occupant of the information representing the first diagnosis result. When the vehicle is in the second mode and the acquisition unit acquires the second diagnosis result, the notification device notifies the target occupant of the specific information instead of the information representing the second diagnosis result. Therefore, the vehicle notification device according to at least one embodiment can notify the target occupant of the driving diagnosis result in a manner preferable for the target occupant.

In the vehicle notification device according to the disclosure described in at least one embodiment, when the specific information is notified by the notification device and a predetermined notification permission condition is satisfied, the notification device notifies the target occupant of the information representing the second diagnosis result.

According to the disclosure described in at least one embodiment, even if the specific information is notified by the notification device, the notification device notifies the target occupant of the information representing the second diagnosis result when the notification permission condition is satisfied. Therefore, for example, when the target occupant determines that there is no problem even if the specific information is notified, it is possible to notify the target occupant of the information representing the second diagnosis result by the notification device of the vehicle in the second mode.

In the vehicle notification device according to the disclosure described in at least one embodiment, the notification permission condition is satisfied when an input device provided in the vehicle is operated.

According to the disclosure described in at least one embodiment, the notification permission condition is satisfied when the input device provided in the vehicle is operated. Therefore, for example, when the target occupant operates the input device, the notification device notifies the target occupant of the information representing the second diagnosis result.

The vehicle notification device according to the disclosure described in at least one embodiment, an occupant determination unit provided in the vehicle for determining whether there is a non-target occupant who is an occupant other than the target occupant in the vehicle based on information from a sensor provided in the vehicle. The mode setting information defines that the vehicle is set to the second mode when the occupant determination unit determines that the non-target occupant is present.

According to the disclosure described in at least one embodiment, the occupant determination unit determines whether there is a non-target occupant in the vehicle based on information from a sensor provided in the vehicle. The mode setting unit sets the vehicle to the second mode when the occupant determination unit determines that the non-target occupant is present. Therefore, when there is a non-target occupant in the vehicle, the notification device notifies the target occupant of the information representing the first diagnosis result and does not notify the target occupant of the information representing the second diagnosis result. Therefore, for example, when it is not preferable for the second diagnosis result to be known to the non-target occupant, the second diagnosis result can be suppressed from being known to the non-target occupant.

In the vehicle notification device according to the disclosure described in at least one embodiment, the mode setting information defines that the vehicle is set to the first mode when the occupant determination unit determines that the non-target occupant is not present.

According to the disclosure described in at least one embodiment, the mode setting unit sets the vehicle to the first mode when the occupant determination unit determines that there the non-target occupant is not present. Therefore, for example, when it is not preferable for the second diagnosis result to be known to the non-target occupant, the notification device of the vehicle in the first mode can notify only the target occupant of the information representing the second diagnosis result.

In the vehicle notification device according to the disclosure described in at least one embodiment, in the disclosure according to at least one embodiment, the mode setting information defines that the vehicle is set to one of the first mode and the second mode when a mode changeover switch provided in the vehicle is operated.

In the disclosure described in at least one embodiment, the mode setting unit sets the vehicle to one of the first mode and the second mode when the mode changeover switch provided in the vehicle is operated. Therefore, for example, the target occupant can set the vehicle to one of the first mode and the second mode.

A vehicle notification system according to the disclosure described in at least one embodiment; and a wireless communication device that generates the mode setting information and that is able to wirelessly transmit the generated mode setting information to the vehicle.

In the disclosure described in at least one embodiment, the wireless communication device generates the mode setting information and wirelessly transmits the generated mode setting information to the vehicle. Therefore, the vehicle having the mode setting unit sets the mode of the vehicle to one of the first mode and the second mode based on the received mode setting information.

A vehicle notification method according to the disclosure described in at least one embodiment includes: a step of setting a mode of a vehicle to one of a first mode and a second mode based on predetermined mode setting information; a step of acquiring a driving diagnosis result of the vehicle; a step of classifying the driving diagnosis result into a first diagnosis result or a second diagnosis result based on content of the driving diagnosis result; and a step of notifying a target occupant of the vehicle of information representing the driving diagnosis result when the vehicle is in the first mode, notifying the target occupant of information representing the first diagnosis result when the vehicle is in the second mode and the first diagnosis result is acquired, and notifying the target occupant of specific information instead of information representing the second diagnosis result when the vehicle is in the second mode and the second diagnosis result is acquired.

In a storage medium according to the disclosure described in at least one embodiment, a program causes a computer to execute: a process of setting a mode of a vehicle to one of a first mode and a second mode based on predetermined mode setting information; a process of acquiring a driving diagnosis result of the vehicle; a process of classifying the driving diagnosis result into a first diagnosis result or a second diagnosis result based on content of the driving diagnosis result; and a process of notifying a target occupant of the vehicle of information representing the driving diagnosis result when the vehicle is in the first mode, notifying the target occupant of information representing the first diagnosis result when the vehicle is in the second mode and the first diagnosis result is acquired, and notifying the target occupant of specific information instead of information representing the second diagnosis result when the vehicle is in the second mode and the second diagnosis result is acquired.

As described above, the vehicle notification device, the vehicle notification system, and the vehicle notification method according to the present disclosure have the excellent effect that the target occupant can be notified of the driving diagnosis result in a manner preferable to the target occupant.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of a vehicle notification device, a vehicle notification system (hereinafter referred to as a system), and a vehicle notification method according to the present disclosure will be described below with reference to the accompanying drawings.

Figure 1:
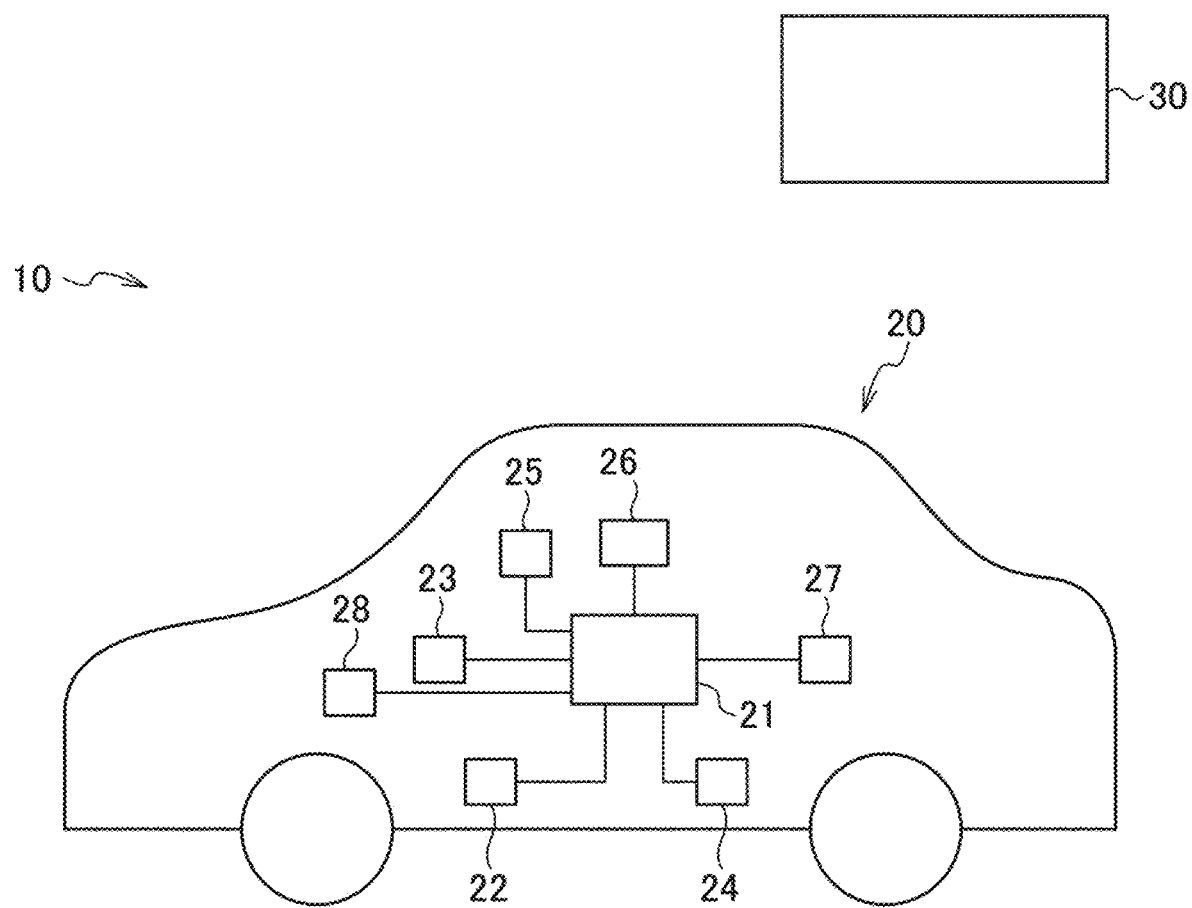
FIG. 1 is an overall view of a vehicle notification system according to an embodiment.

As shown in FIG. 1, a system 10 of the present embodiment includes a vehicle 20 and an external server (wireless communication device) 30. The external server of the present embodiment is owned by a taxi operation company, and the taxi operation company owns a large number of vehicles 20 used as taxis. Each vehicle 20 is assigned an ID.

The vehicle 20 capable of data communication with the external server 30 via a network includes an electronic control unit (ECU) 21, a wheel speed sensor 22, an accelerator operation amount sensor 23, a brake depression force sensor 24, a steering angle sensor 25, an in-vehicle camera (sensor) 26, a global positioning system (GPS) receiver 27, and a display (notification device) (input device) (vehicle notification device) 28 as shown in FIG. 1. The wheel speed sensor 22, the accelerator operation amount sensor 23, the brake depression force sensor 24, the steering angle sensor 25, the in-vehicle camera 26, the GPS receiver 27, and the display 28 are connected to the ECU 21. In the following description, the wheel speed sensor 22, the accelerator operation amount sensor 23, the brake depression force sensor 24, the steering angle sensor 25, the in-vehicle camera 26, and the GPS receiver 27 may be collectively referred to as "information acquisition unit".

The vehicle 20 is provided with four wheel speed sensors 22. Each wheel speed sensor 22 detects a wheel speed of the corresponding one of the four wheels. The accelerator operation amount sensor 23 detects the accelerator operation amount that changes in conjunction with the operation of the accelerator pedal by the driver (target occupant) (not shown) sitting in the driver's seat of the vehicle 20. The brake depression force sensor 24 detects a brake depression force input by a driver to a brake pedal (not shown). The steering angle sensor 25 detects the steering angle of the steering wheel (not shown) operated by the driver. The in-vehicle camera 26 acquires image data of a subject located inside the vehicle 20. This subject includes, for example, the driver sitting in the driver's seat, and an occupant other than the driver (non-target occupant) (not shown) sitting in a seat other than the driver's seat. The GPS receiver 27 acquires information on a position where the vehicle 20 is traveling (hereinafter, referred to as "position data") by receiving a GPS signal transmitted from a GPS satellite. Acquired data acquired by the information acquisition unit every time a predetermined time elapses is transmitted to the ECU 21 via an in-vehicle network provided in the vehicle 20, and stored in a storage 21D of the ECU 21, which will be described later, in association with time information. This in-vehicle network is, for example, a controller area network (CAN). In the following description, the acquired data acquired by the information acquisition unit may be referred to as "vehicle-related information".

Figure 9:
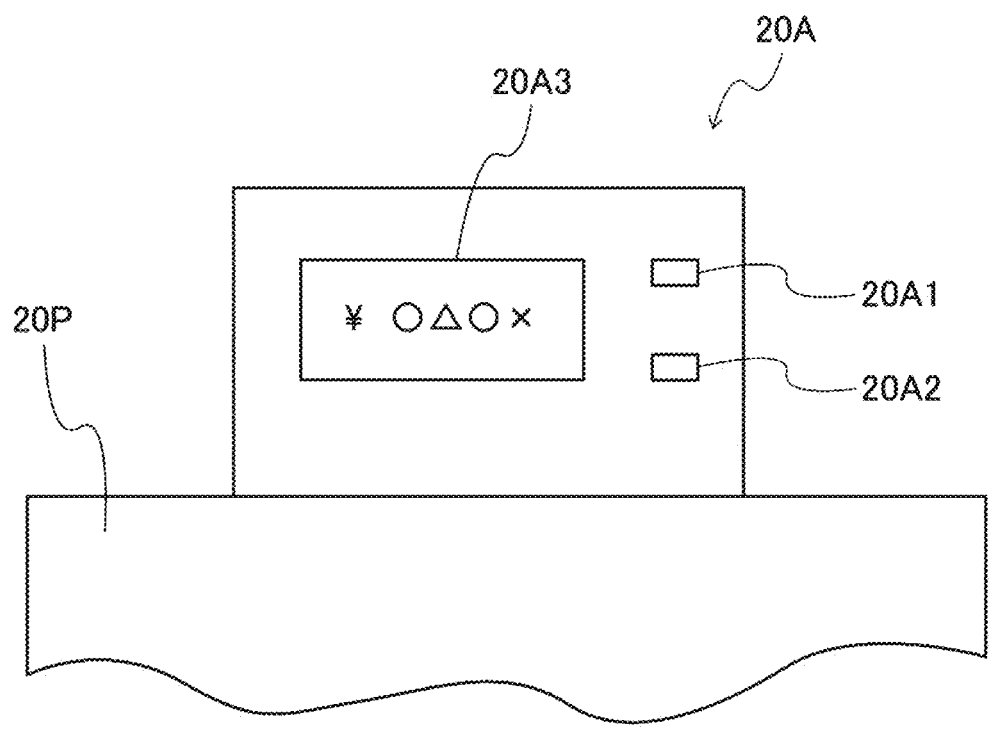
FIG. 9 is a front view showing an instrument panel and a fare meter device.
Figure 10:
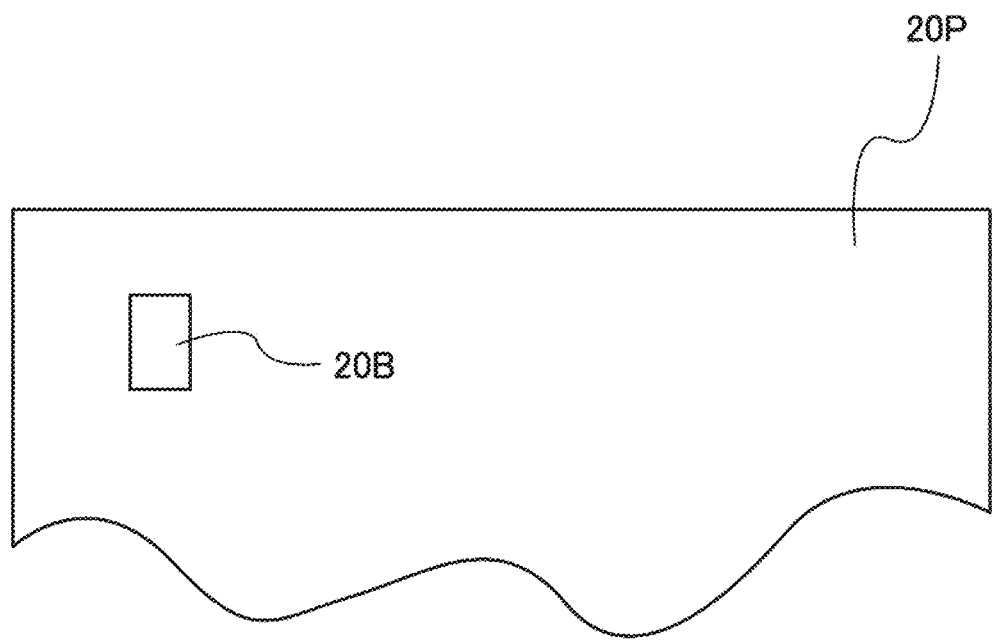
FIG. 10 is a front view showing the instrument panel and a mode changeover switch.

The display 28 having a touch panel provided in the instrument panel (see FIGS. 9 and 10) 20P of the vehicle 20 in the right-left direction can display various images.

Figure 2:
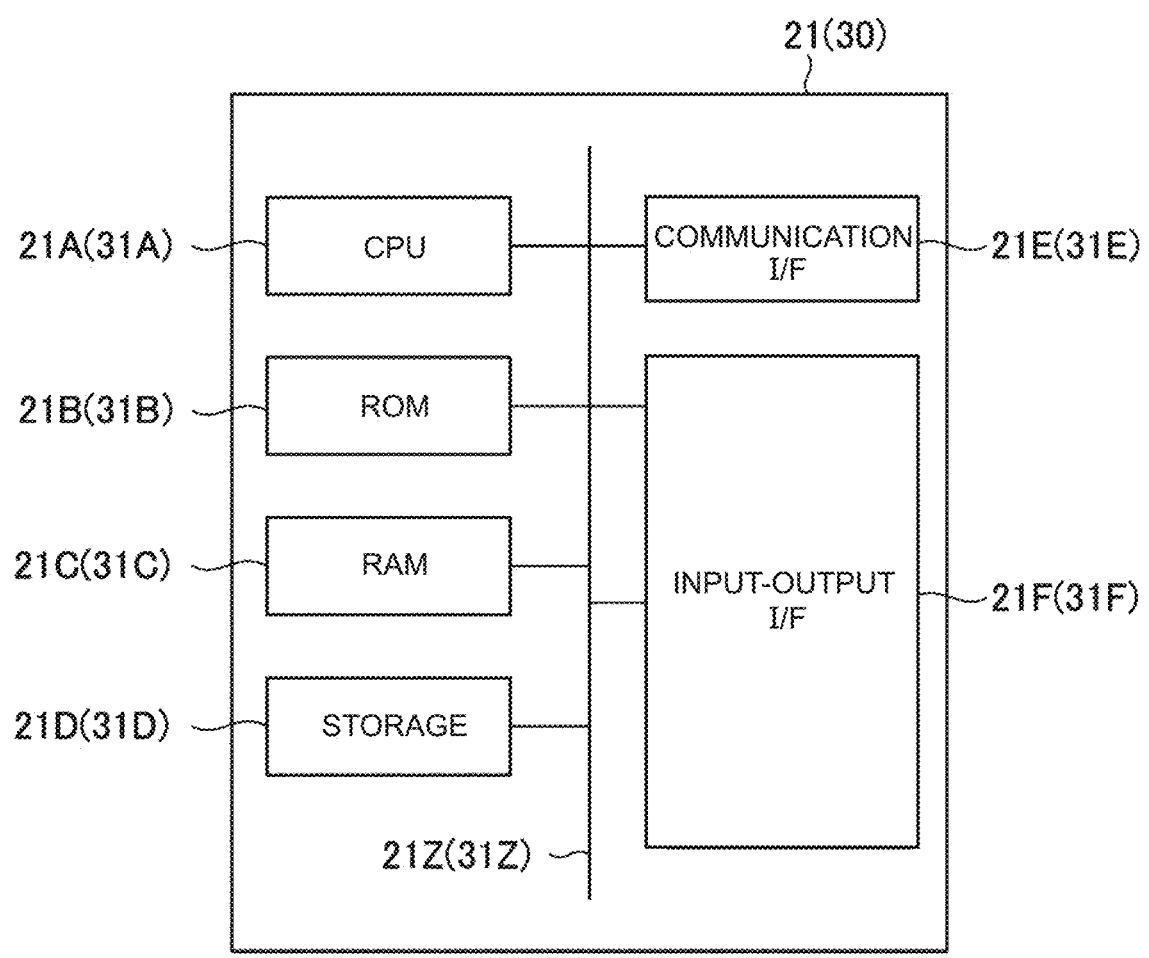
FIG. 2 is a control block diagram of an electronic control unit (ECU) of a vehicle and an external server shown in FIG. 1.

The ECU (computer) 21 is configured to include a central processing unit (CPU: processor) 21A, a read-only memory (ROM) 21B, a random access memory (RAM) 21C, a storage 21D, a communication interface (I/F) 21E, and an input-output I/F 21F as shown in FIG. 2. The CPU 21A, the ROM 21B, the RAM 21C, the storage 21D, the communication I/F 21E, and the input-output I/F 21F are connected so as to be able to communicate with each other via a bus 21Z. The CPU 21A can acquire information related to the date and time from a timer (not shown).

The CPU 21A is a central processing unit that executes various programs and controls various units. That is, the CPU 21A reads a program from the ROM 21B or the storage 21D and executes the program using the RAM 21C as a work area. The CPU 21A controls each configuration and executes various arithmetic processes (information processes) in accordance with the program recorded in the ROM 21B or the storage 21D. The ROM 21B or the storage 21D is an example of a storage medium.

The ROM 21B stores various programs and various data. The RAM 21C temporarily stores programs or data as a work area. The storage 21D is composed of a storage device such as a hard disk drive (HDD) or a solid state drive (SSD), and stores various programs and various data.

The communication I/F 21E is an interface for communicating with various devices. For example, the communication I/F 21E can communicate with a device other than the ECU 21 provided in the vehicle 20 via the in-vehicle network. These devices include, for example, the information acquisition unit. Further, the communication I/F 21E can wirelessly communicate with the external server 30 via a network (for example, the Internet).

Figure 3:
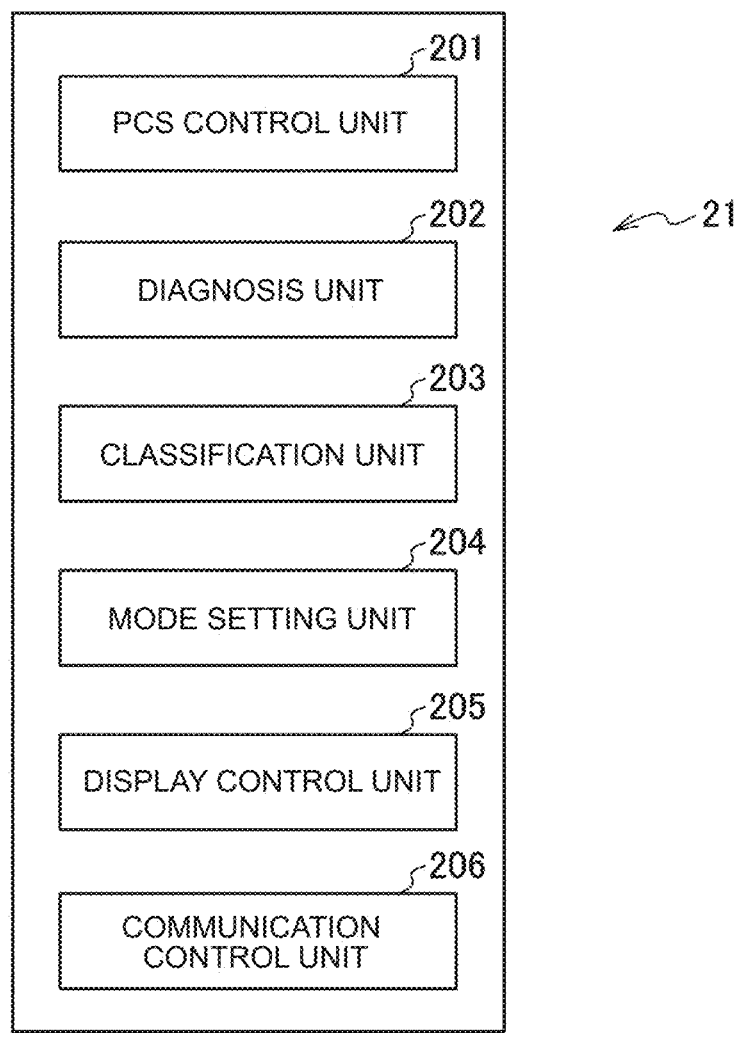
FIG. 3 is a functional block diagram of the ECU.

FIG. 3 is a block diagram showing an example of a functional configuration of the ECU 21. The ECU 21 includes, as functional configurations, a PCS control unit 201, a diagnosis unit (acquisition unit) (vehicle notification device) 202, a classification unit (vehicle notification device) 203, a mode setting unit (vehicle notification device) 204, a display control unit 205, and a communication control unit 206. These functional configurations are realized as the CPU 21A reads and executes the program stored in the ROM 21B.

The PCS control unit 201 has a function of controlling a precrash safety system (PCS) mounted on the vehicle 20. That is, when a predetermined condition is satisfied, the PCS control unit 201 controls a brake actuator of a brake device (not shown) of the vehicle 20 to generate a braking force in the brake device. For example, based on information acquired by the ECU 21 from a ranging sensor (not shown) provided in the vehicle 20, when the PCS control unit 201 determines that the vehicle 20 is likely to collide with another vehicle located immediately in front of the vehicle 20, the predetermined condition is satisfied.

The diagnosis unit 202 performs driving diagnosis based on the acquired data of the wheel speed sensor 22, the accelerator operation amount sensor 23, the brake depression force sensor 24, and the steering angle sensor 25. For example, as disclosed in Japanese Unexamined Patent Application Publication No. 2019-12481 (JP 2019-12481 A) and Japanese Unexamined Patent Application Publication No. 2020-95403 (JP 2020-95403 A), a driving diagnosis method that is performed based on the above acquired data is well known. The diagnosis unit 202 determines whether the vehicle speed of the vehicle 20 exceeds the speed limit based on information on the speed limit of each road included in the map data recorded in the storage 21D, the position data of the vehicle 20, and the acquired data of the wheel speed sensor 22. Result information regarding speed limit violations may be referred to as speed limit violation data.

The diagnosis unit 202 performs driving diagnosis on the operation of the accelerator pedal of the vehicle 20 based on the acquired data of the accelerator operation amount sensor 23 and the acquired data of the wheel speed sensor 22. Further, the diagnosis unit 202 performs driving diagnosis on the operation of the brake pedal of the vehicle 20 based on the acquired data of the brake depression force sensor 24 and the acquired data of the wheel speed sensor 22. Furthermore, the diagnosis unit 202 performs driving diagnosis on the steering operation based on the acquired data of the steering angle sensor 25.

When the PCS control unit 201 activates the PCS, the diagnosis unit 202 generates PCS activation data indicating this.

The information on the result of the driving diagnosis based on the acquired data of the wheel speed sensor 22, the accelerator operation amount sensor 23, the brake depression force sensor 24, and the steering angle sensor 25, the speed limit violation data, and the PCS activation data is the information on the results of the real-time driving diagnosis. These result information are recorded in the storage 21D together with the position data and the time information. In the following description, the results of the real-time driving diagnosis are referred to as "driving diagnosis result".

Figure 4:
FIG. 4 is a diagram showing a classification list recorded in the ECU.

The classification unit 203 classifies the driving diagnosis result generated by the diagnosis unit 202, based on a classification list 21L recorded in the ROM 21B or the storage 21D and shown in FIG. 4. The classification list 21L classifies the driving diagnosis result into two attributes. That is, the classification list 21L defines the first diagnosis result and the second diagnosis result as the attributes of the driving diagnosis result. The first diagnosis result is a positive driving diagnosis result, and the second diagnosis result is a negative driving diagnosis result.

For example, the driving diagnosis result indicating smooth accelerator pedal operation, the driving diagnosis result indicating gentle brake pedal operation, and the driving diagnosis result indicating smooth steering operation belong to the first diagnosis result. For example, the driving diagnosis result indicating abrupt accelerator pedal operation, the driving diagnosis result indicating abrupt brake pedal operation, the driving diagnosis result indicating abrupt steering operation, the driving diagnosis result indicating that the PCS is activated, and the driving diagnosis result indicating the speed limit violation belong to the second diagnosis result.

The mode setting unit 204 switches modes of the vehicle 20 based on the mode setting information recorded in the storage 21D. This mode includes a first mode and a second mode. The first mode is a mode in which all driving diagnosis results are immediately output to the display 28. The second mode is a mode in which the driving diagnosis result belonging to the first diagnosis result is immediately output to the display 28 and the driving diagnosis result belonging to the second diagnosis result is not immediately output to the display 28. Further, when the vehicle 20 is in the second mode and the diagnosis unit 202 generates the second diagnosis result, the display 28 displays later-described specific information SI instead of the second diagnosis result.

The display control unit 205 controls the display 28. The display 28 controlled by the display control unit 205 can display information on the driving diagnosis result for a predetermined display time. This display time is, for example, 5 seconds.

Note that the display control unit 205 changes the control method of the display 28 depending on whether the vehicle 20 is in the first mode or the second mode.

Figure 6:
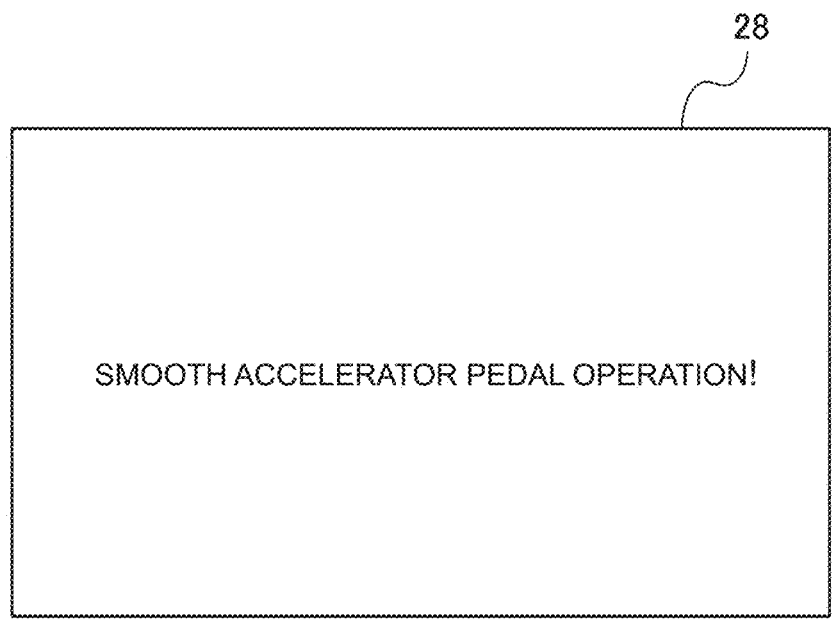
FIG. 6 is a diagram representing a vehicle display displaying a first diagnosis result.
Figure 7:
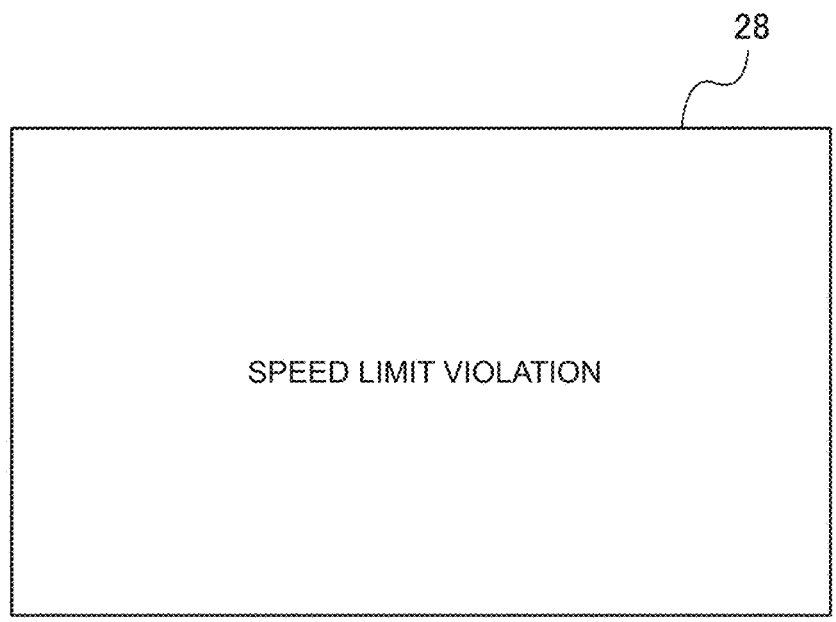
FIG. 7 is a diagram representing the display displaying a second diagnosis result.

For example, when the vehicle 20 is in the first mode, the display control unit 205 causes the display 28 to immediately display all the driving diagnosis results. For example, when the diagnosis unit 202 generates the first diagnosis result that "the vehicle 20 has performed a smooth accelerator pedal operation", the display 28 immediately displays the characters "smooth accelerator pedal operation" as shown in FIG. 6. When the diagnosis unit 202 generates the second diagnosis result that the vehicle speed of the vehicle 20 has exceeded the speed limit, the display 28 immediately displays the characters "speed limit violation" as shown in FIG. 7.

Figure 8:
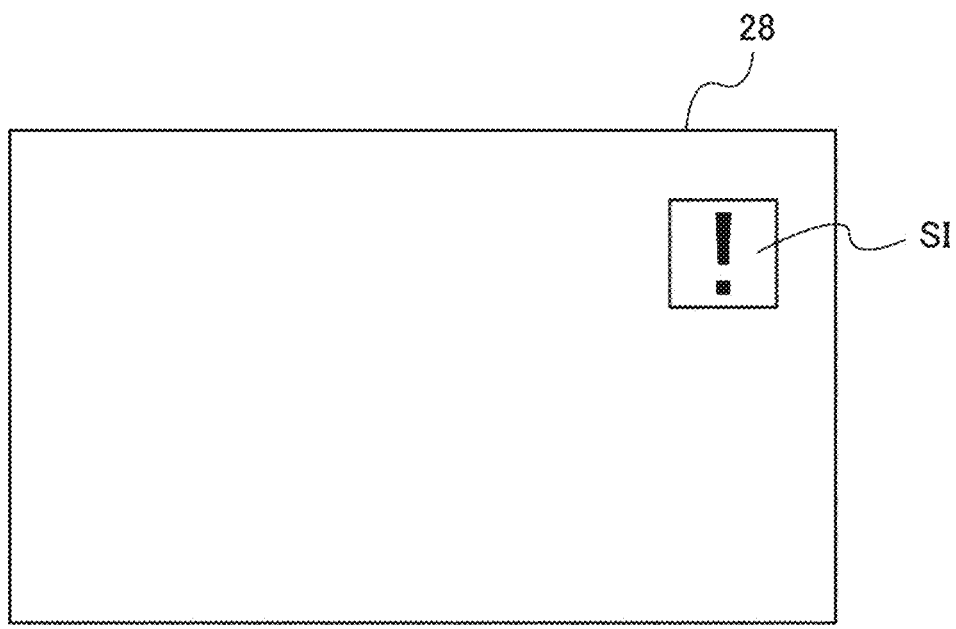
FIG. 8 is a diagram representing the display displaying specific information.

On the other hand, when the vehicle 20 is in the second mode, the display control unit 205 causes the display 28 to immediately display the driving diagnosis result belonging to the first diagnosis result. However, when the vehicle 20 is in the second mode, the display control unit 205 does not cause the display 28 to immediately display the driving diagnosis result belonging to the second diagnosis result. In this case, the display control unit 205 causes the display 28 to display the specific information SI as shown in FIG. 8. The specific information SI continues to be displayed on the display 28 until a touch operation is performed on the image representing the specific information SI on the display 28. The specific information SI of the present embodiment is an exclamation mark.

Furthermore, regardless of whether the vehicle 20 is in the first mode or the second mode, when a touch operation is performed on the image representing the specific information SI on the display 28, the display control unit 205 controls the display 28 so as to delete the specific information SI and display the driving diagnosis result belonging to the second diagnosis result. When a touch operation is performed on the specific information SI on the display 28, a predetermined notification permission condition is satisfied. The driver understands the meaning of the specific information SI. In other words, the driver understands that the driving diagnosis result belonging to the second diagnosis result will be displayed on the display 28 when a touch operation is performed on the specific information SI with a hand or the like. On the other hand, occupants other than the driver do not understand the meaning of the specific information SI.

The communication control unit 206 controls the communication I/F 21E. The communication I/F 21E controlled by the communication control unit 206 is capable of wireless communication with the external server 30. For example, the communication I/F 21E can receive the mode setting information, which will be described later, transmitted from the external server 30. The communication I/F 21E that has received the mode setting information records the mode setting information in the storage 21D.

As shown in FIG. 2, the external server 30 is configured to include a CPU 31A, a ROM 31B, a RAM 31C, a storage 31D, a communication I/F 31E, and an input-output I/F 31F. The CPU 31A, the ROM 31B, the RAM 31C, the storage 31D, the communication I/F 31E, and the input-output I/F 31F are connected so as to be able to communicate with each other via a bus 31Z. The CPU 31A, the ROM 31B, the RAM 31C, the storage 31D, the communication I/F 31E, and the input-output I/F 31F have functions corresponding to the CPU 21A, the ROM 21B, the RAM 21C, the storage 21D, the communication I/F 21E, and the input-output I/F 21F, respectively.

Figure 5:
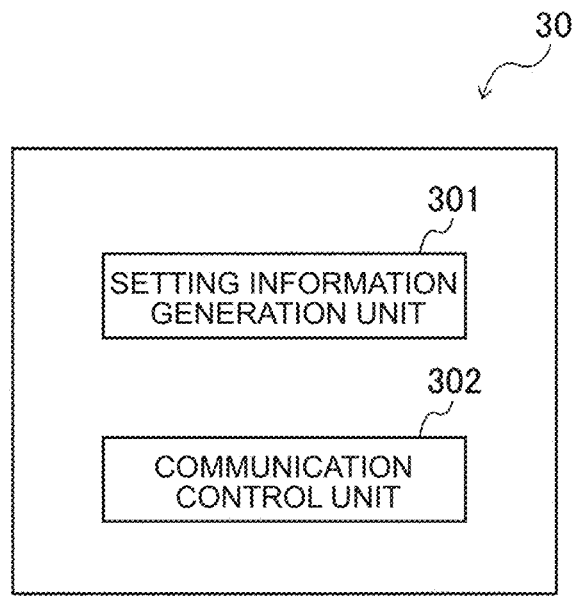
FIG. 5 is a functional block diagram of the external server.

FIG. 5 is a block diagram showing an example of a functional configuration of the external server 30. The external server 30 has a setting information generation unit 301 and a communication control unit 302 as functional configurations. These functional configurations are realized as the CPU 31A reads and executes the program stored in the ROM 31B.

The setting information generation unit 301 generates the mode setting information for each vehicle 20, which is used by the mode setting unit 204 of the vehicle 20 to set the mode of the vehicle 20. That is, the mode setting information represents rules for determining the mode of the vehicle 20, and the mode setting information generated by the setting information generation unit 301 includes ID information representing the ID of each vehicle 20. The mode setting information generated by the setting information generation unit 301 is recorded in the storage 31D. When the setting information generation unit 301 updates the mode setting information, the setting information generation unit 301 updates the mode setting information recorded in the storage 31D with new information.

The external server 30 has an information input device (not shown). An administrator (not shown) of the external server 30 can use this information input device to input information representing rules for determining the mode of the vehicle 20. When the information is input using the information input device, the setting information generation unit 301 generates the mode setting information representing the input information.

The administrator can generate various mode setting information using the information input device. Examples 1 to 3 below are specific examples of the mode setting information.

Example 1: When the CPU (occupant determination unit) (vehicle notification device) 21A of the ECU 21 determines that only the driver is present in the vehicle 20 based on the image data acquired by the in-vehicle camera 26, the mode setting unit 204 sets the vehicle 20 to the first mode. On the other hand, when the ECU 21 determines that there is an occupant other than the driver in the vehicle, the mode setting unit 204 sets the vehicle 20 to the second mode.

The image acquired by the in-vehicle camera 26 is transmitted to the ECU 21. The ROM 21B of the ECU 21 stores determination data, which is image data of the face of the driver, and when the image data acquired by the in-vehicle camera 26 matches the determination data, the ECU 21 determines that the driver is on board. When the image data acquired from the in-vehicle camera 26 includes human image data that does not match the determination data, the ECU 21 determines that an occupant other than the driver is on board.

Example 2: When the fare meter device 20A (see FIG. 9) provided on the instrument panel 20P is not calculating the fare, the mode setting unit 204 sets the vehicle 20 to the first mode. On the other hand, when the fare meter device 20A is calculating the fare, the mode setting unit 204 sets the vehicle 20 to the second mode.

When the start switch 20A1 provided in the fare meter device 20A is pushed, the fare meter device 20A starts calculating the fare. That is, a number representing the fare is displayed on the fare display 20A3. The fare calculation ends when the end switch 20A2 is pushed. The fare meter device 20A is connected to the ECU 21, and the CPU 21A recognizes that the start switch 20A1 and the end switch 20A2 have been pressed. Usually, the driver causes the fare meter device 20A to calculate the fare when the occupant gets on the vehicle 20, and pushes the end switch 20A2 when the occupant gets off.

Example 3: Every time the mode changeover switch 20B (see FIG. 10) provided on the instrument panel 20P is pressed, the mode setting unit 204 switches the mode of the vehicle 20 between the first mode and the second mode.

The mode changeover switch 20B is connected to the ECU 21, and the CPU 21A recognizes that the mode changeover switch 20B has been pressed.

The communication control unit 302 controls the communication I/F 31E. The communication I/F 31E wirelessly transmits the mode setting information recorded in storage 31D to the communication I/F 21E of the vehicle 20 indicated by the ID information included in the mode setting information.

Operation and Effects

Next, the operation and effects of the present embodiment will be described.

Figure 11:
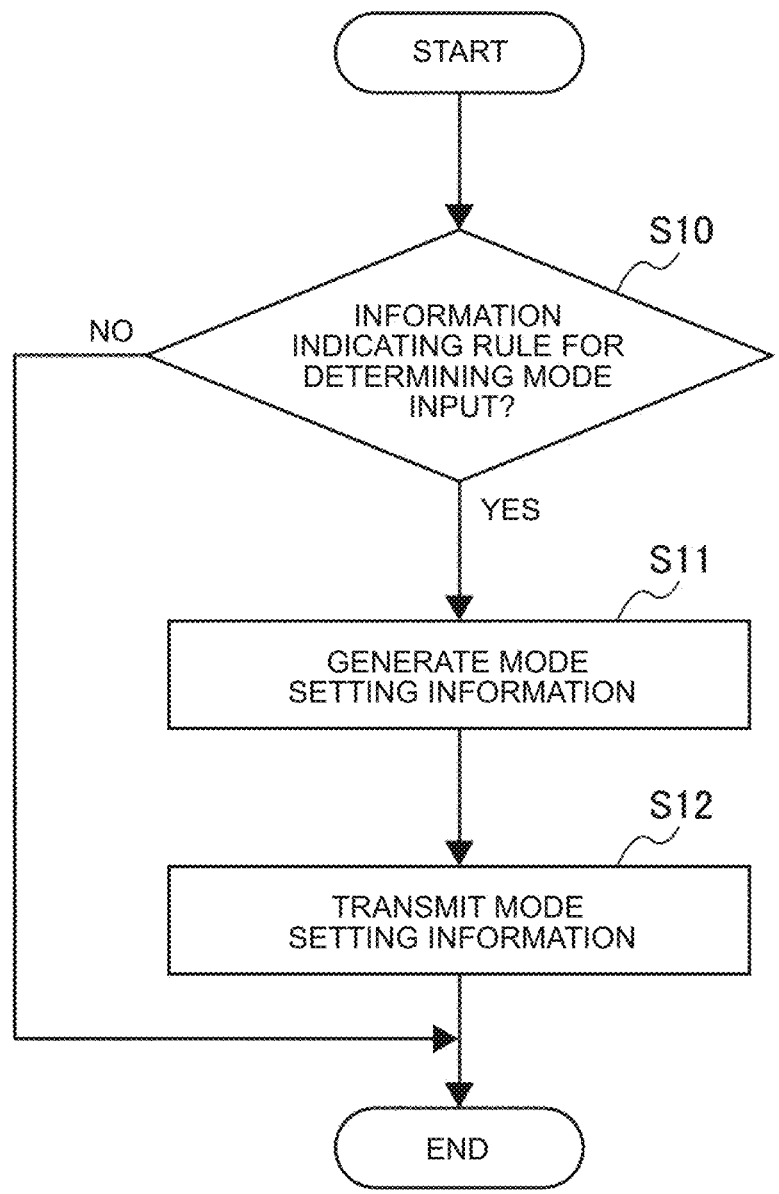
FIG. 11 is a flowchart showing a process executed by the external server.

First, the flow of the process executed by the CPU 31A of the external server 30 will be described with reference to the flowchart shown in FIG. 11. The CPU 31A repeatedly executes the process of the flowchart shown in FIG. 11 every time a predetermined time elapses. In the following description, the process of the flowchart shown in each of FIGS. 11 to 14 is executed by one processor (CPU), but the each process of the flowchart shown in FIGS. 11 to 14 may be executed by a plurality of devices (CPUs).

First, in step S10 (hereinafter, the word "step" is omitted), the CPU 31A determines whether information indicating the mode of the vehicle 20 has been input using the information input device.

When the determination result is Yes in S10, the CPU 31A proceeds to S11 and generates the mode setting information represented by the information input using the information input device.

Subsequently, the CPU 31A proceeds to S12 and controls the communication I/F 31E so as to wirelessly transmit the generated mode setting information to the vehicle 20.

When the determination result is No in S10 or when the process of S12 is ended, the CPU 31A temporarily ends the process of the flowchart shown in FIG. 11.

Next, the flow of the process performed by the CPU 21A of the vehicle 20 will be described. The CPU 21A repeatedly executes the process of the flowchart shown in FIG. 12 to FIG. 14 every time a predetermined time elapses. First, the description will be made with reference to the flowchart of FIG. 12.

In step S20, the CPU 21A determines whether the mode setting information is recorded in the storage 21D.

When the determination result is Yes in S20, the CPU 21A proceeds to S21 and sets the mode of the vehicle 20 to a predetermined mode while referring to the mode setting information. For example, when the mode setting information of Example 1 is recorded in the storage 21D and the CPU 21A determines that only the driver is present in the vehicle 20 based on the image data acquired by the in-vehicle camera 26, the CPU 21A sets the vehicle 20 to the first mode. Further, for example, when the mode setting information of Example 2 is recorded in the storage 21D and the CPU 21A determines that the fare meter device 20A is calculating the fare, the CPU 21A sets the vehicle 20 to the second mode.

Figure 12:
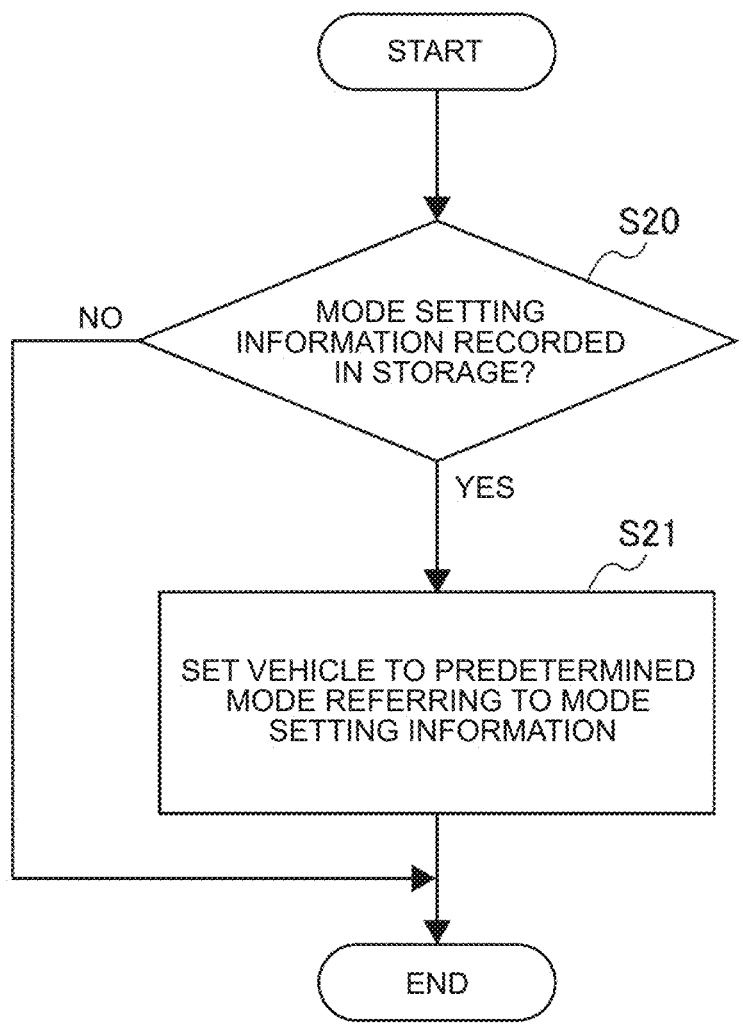
FIG. 12 is a flowchart showing a process executed by a central processing unit (CPU) of the ECU.

When the determination result is No in S20 or when the process of S21 is ended, the CPU 21A temporarily ends the process of the flowchart shown in FIG. 12.

Next, the process of the flowchart of FIG. 13 will be described.

In step S30, the CPU 21A determines whether the vehicle-related information has been acquired.

When the determination result is Yes in S30, the CPU 21A proceeds to S31 and records the acquired vehicle-related information in the storage 21D.

Subsequently, the CPU 21A proceeds to S32 and determines whether a sufficient amount of the vehicle-related information for executing the real-time driving diagnosis is recorded in the storage 21D in the time period between the current time and the time a predetermined time before the current time.

When the determination result is Yes in S32, the CPU 21A proceeds to S33, executes the real-time driving diagnosis, and records the driving diagnosis result in the storage 21D.

Subsequently, the CPU 21A proceeds to S34 and determines whether the mode of the vehicle 20 is the second mode.

When the determination result is No in S34, the CPU 21A proceeds to S35 and causes the display 28 to display the driving diagnosis result generated in step S33 for the above display time. That is, in this case, the driving diagnosis result is displayed on the display 28 regardless of whether the driving diagnosis result generated in step S33 is the first diagnosis result or the second diagnosis result.

On the other hand, when the determination result is Yes in S34, the CPU 21A proceeds to S36 and determines whether the driving diagnosis result generated in step S33 is the second diagnosis result.

When the determination result is No in S36, the CPU 21A proceeds to S35. That is, when the driving diagnosis result generated in step S33 is the first diagnosis result, the driving diagnosis result is displayed on the display 28.

On the other hand, when the determination result is Yes in S36, the CPU 21A proceeds to S37 and causes the display 28 to display the specific information SI.

Figure 13:
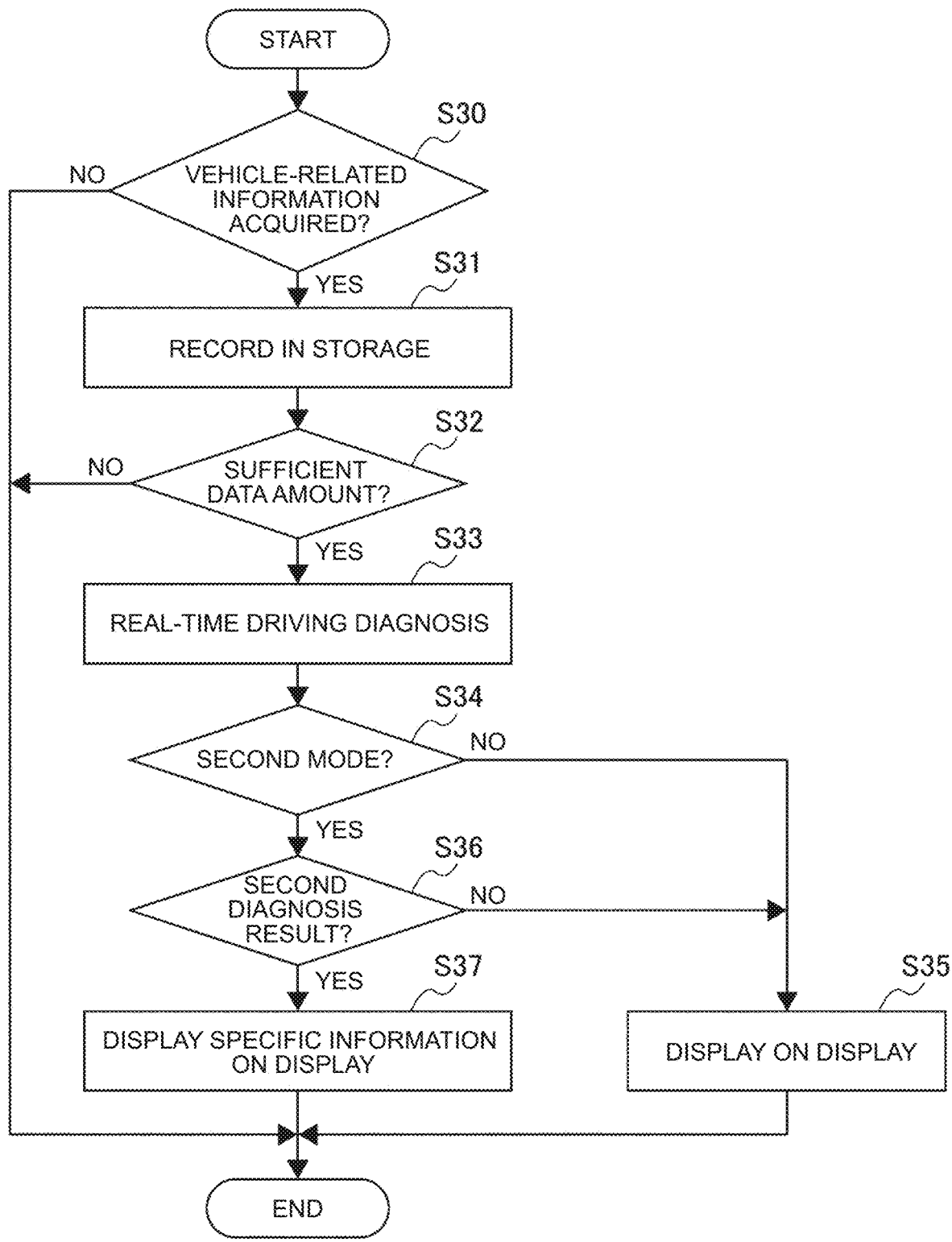
FIG. 13 is a flowchart showing a process executed by the CPU.

When the determination result is No in S30, S32 or when the process of S35, 37 is ended, the CPU 21A temporarily ends the process of the flowchart shown in FIG. 13.

Next, the process of the flowchart of FIG. 14 will be described.

In step S40, the CPU 21A determines whether the specific information SI is displayed on the display 28.

When the determination result is Yes in S40, the CPU 21A proceeds to S41 and determines whether a touch operation has been performed on the image representing the specific information SI on the display 28. For example, when the driver performs a touch operation on the image representing the specific information SI with a hand, the CPU 21A determines Yes in S41.

When the determination result is Yes in S41, the CPU 21A proceeds to S42, deletes the specific information SI from the display 28, and causes the display 28 to display the second diagnosis result generated in step S33 for a predetermined period of time. That is, regardless of whether the vehicle 20 is in the first mode or the second mode, when the determination result is Yes in S41, the specific information SI is deleted from the display 28 and the second diagnosis result is displayed on the display 28. At this time, the display 28 displays the time when the second diagnosis result was generated and the map data including the position where the driving operation related to the second diagnosis result was executed. It should be noted that the CPU 21A may determine Yes a plurality of times in succession in S36 of the flowchart of FIG. 13. In this case, a plurality of second diagnosis results is recorded in the storage 21D. Therefore, when the process of S42 is performed in this case, the display 28 displays a plurality of second diagnosis results.

Figure 14:
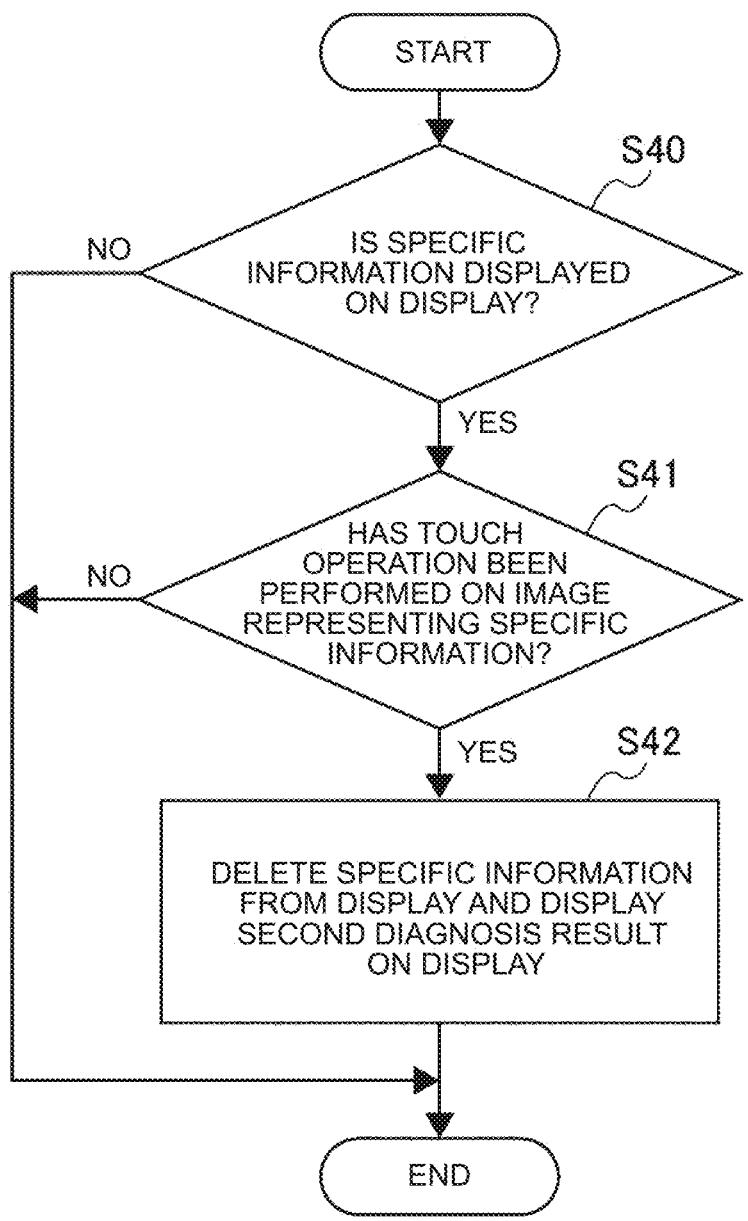
FIG. 14 is a flowchart showing a process executed by the CPU.

When the determination result is No in S40, S41 or when the process of S42 is ended, the CPU 21A temporarily ends the process of the flowchart shown in FIG. 14.

As described above, in the present embodiment, when the vehicle 20 is in the first mode, the display 28 notifies a person inside the vehicle 20 of the information indicating the driving diagnosis result of the vehicle 20. That is, the display 28 of the vehicle 20 in the first mode displays the driving diagnosis result immediately after the driving diagnosis result is generated regardless of whether the driving diagnosis result generated by the diagnosis unit 202 is the first diagnosis result or the second diagnosis result. Therefore, the driver in the vehicle 20 in the first mode can immediately recognize the driving diagnosis result generated by the diagnosis unit 202.

On the other hand, when the vehicle 20 is in the second mode, the display method of the driving diagnosis result on the display 28 changes depending on the attribute of the driving diagnosis result of the vehicle 20. That is, when the driving diagnosis result is the first diagnosis result, the display 28 displays the first diagnosis result immediately after the first diagnosis result is generated. Therefore, the driver in the vehicle 20 in the second mode can immediately recognize the first diagnosis result generated by the diagnosis unit 202. In this case, an occupant other than the driver also recognizes the first diagnosis result by looking at the display 28. Since the first diagnosis result is a positive driving diagnosis result, there is little possibility that an undesirable situation will occur for the driver when the occupant sees the first diagnosis result.

When the diagnosis unit 202 of the vehicle 20 in the second mode generates the second diagnosis result, the display 28 displays the specific information SI instead of the information representing the second diagnosis result. The driver understands the meaning of the specific information SI. Thus, normally, the driver does not perform a touch operation on the specific information SI when there is an occupant other than the driver in the vehicle. Therefore, when the diagnosis unit 202 of the vehicle 20 in the second mode generates the second diagnosis result, the risk that the second diagnosis result that is a negative driving diagnosis result is displayed on the display 28 and an occupant who sees the display 28 recognizes the second diagnosis result is small.

When the diagnosis unit 202 of the vehicle 20 in the second mode generates the second diagnosis result, the driver normally performs a touch operation on the specific information SI when vehicle 20 is changed to the first mode. That is, the driver normally performs a touch operation on the specific information SI when the driver is in the vehicle cabin of the vehicle 20 alone to display the second diagnosis result on the display 28. At this time, the display 28 displays the time when the second diagnosis result was generated and the map data including the position where the driving operation related to the second diagnosis result was executed. The driver can therefore recognize the time and position at which the driving operation related to the second diagnosis result was executed.

As described above, the present embodiment can notify the driver of the vehicle 20 of the driving diagnosis result in a manner preferable to the driver.

Furthermore, in the present embodiment, the external server 30 generates the mode setting information, and the mode of the vehicle 20 is set based on the generated mode setting information. Therefore, the administrator of the external server 30 can set rules for determining the mode of each vehicle 20.

Although the vehicle notification device, the system 10, the vehicle notification method, and the program according to the embodiment have been described above, the design of these can be appropriately changed without departing from the scope of the present disclosure.

For example, the specific information SI in the present embodiment is an exclamation mark, but the specific information SI may be a symbol or a figure different from the exclamation mark. Also, the specific information SI may be characters. However, regardless of whether the specific information SI is a symbol, a figure, or a character, the specific information SI needs to be information that does not represent the content of the second diagnosis result and that does not remind the person who recognizes the specific information SI of the second diagnosis result. Furthermore, the specific information SI may include symbols, figures, and characters. Also, the specific information SI may include any two of symbols, figures, and characters.

A device other than the display 28 may be used as the notification device that notifies the driver or the like of the driving diagnosis result generated by the diagnosis unit 202. For example, the vehicle 20 may be provided with a speaker (not shown) capable of outputting a voice representing the driving diagnosis result as the notification device.

When the vehicle 20 is in the second mode and the diagnosis unit 202 generates the second diagnosis result, the speaker may emit a voice (specific information) indicating this.

When the vehicle 20 is in the second mode, the notification device may prohibit notification of the second diagnosis result. This eliminates the risk that, in the case where the vehicle 20 is in the second mode and there is an occupant other than the driver in the vehicle, the second diagnosis result will be known to the occupant when the driver accidentally performs a touch operation on the specific information SI displayed on the display 28.

The external server 30 may have a function corresponding to the diagnosis unit 202 and may perform the driving diagnosis based on the vehicle-related information transmitted from the vehicle 20. In this case, the external server 30 wirelessly transmits the generated driving diagnosis result to the communication I/F (acquisition unit) 21E of the vehicle 20, and the classification unit 203 classifies the driving diagnosis result received by the vehicle 20.

The external server 30 may have functions corresponding to the diagnosis unit 202 and the classification unit 203. In this case, the external server 30 performs the driving diagnosis based on the vehicle-related information transmitted from the vehicle 20, and classifies the generated driving diagnosis result based on the classification list 21L recorded in the ROM 31B or the storage 31D. The external server 30 wirelessly transmits the generated driving diagnosis result to the vehicle 20 together with the classification information.

The mode setting information may be such that the vehicle 20 is always set to the second mode.

The vehicle 20 does not have to be a taxi.

The vehicle 20 may include a voice input device (not shown) connected to the ECU 21, and the CPU 21A may have a voice recognition function. In this case, for example, when the specific information SI is displayed on the display 28 and the CPU 21A recognizes a specific voice uttered by the driver and input to the voice input device, the above notification permission condition is satisfied.

The content of the classification list 21L may be changeable using a touch panel provided on the display 28 or a voice input device. The external server 30 may wirelessly transmit the input information for the information input device connected to the external server 30 to the vehicle 20, and the ECU 21 may change the content of the classification list 21L based on this input information.

The ECU 21 may generate the mode setting information based on information input using a touch panel provided on the display 28 or a voice input device.

APPENDIX

The vehicle notification device according to the present disclosure may be any combination of configurations 1 to 6 below.

<Configuration 1> A vehicle notification device including: a mode setting unit provided in a vehicle for setting a mode of the vehicle to one of a first mode and a second mode based on predetermined mode setting information; an acquisition unit provided in the vehicle for acquiring a driving diagnosis result of the vehicle; a classification unit that classifies the driving diagnosis result into a first diagnosis result or a second diagnosis result based on content of the driving diagnosis result; and a notification device provided in the vehicle for notifying, when the vehicle is in the first mode, a target occupant of the vehicle of information representing the driving diagnosis result acquired by the acquisition unit, notifying the target occupant of information representing the first diagnosis result when the vehicle is in the second mode and the acquisition unit acquires the first diagnosis result, and notifying the target occupant of specific information instead of information representing the second diagnosis result when the vehicle is in the second mode and the acquisition unit acquires the second diagnosis result.

<Configuration 2> The vehicle notification device in which, when the specific information is notified by the notification device and a predetermined notification permission condition is satisfied, the notification device notifies the target occupant of the information representing the second diagnosis result.

<Configuration 3> The vehicle notification device in which, the notification permission condition is satisfied when an input device provided in the vehicle is operated.

<Configuration 4> The vehicle notification device further including: an occupant determination unit provided in the vehicle for determining whether there is a non-target occupant who is an occupant other than the target occupant in the vehicle based on information from a sensor provided in the vehicle, in which the mode setting information defines that the vehicle is set to the second mode when the occupant determination unit determines that the non-target occupant is present.

<Configuration 5> The vehicle notification device in which, the mode setting information defines that the vehicle is set to the first mode when the occupant determination unit determines that the non-target occupant is not present.

<Configuration 6> The vehicle notification device in which, the mode setting information defines that the vehicle is set to one of the first mode and the second mode when a mode changeover switch provided in the vehicle is operated.

Further, the vehicle notification system according to the present disclosure may be a combination of configuration 7 below and at least one of configurations 1 to 6.

<Configuration 7> A vehicle notification system including: the vehicle; and a wireless communication device that generates the mode setting information and that is able to wirelessly transmit the generated mode setting information to the vehicle.

Further, the vehicle notification method according to the present disclosure may be a combination of configuration 8 below and at least one of configurations 1 to 6.

<Configuration 8> A vehicle notification method including: a step of setting a mode of a vehicle to one of a first mode and a second mode based on predetermined mode setting information; a step of acquiring a driving diagnosis result of the vehicle; a step of classifying the driving diagnosis result into a first diagnosis result or a second diagnosis result based on content of the driving diagnosis result; and a step of notifying a target occupant of the vehicle of information representing the driving diagnosis result when the vehicle is in the first mode, notifying the target occupant of information representing the first diagnosis result when the vehicle is in the second mode and the first diagnosis result is acquired, and notifying the target occupant of specific information instead of information representing the second diagnosis result when the vehicle is in the second mode and the second diagnosis result is acquired.

Further, the program according to the present disclosure may be a combination of configuration 9 below and at least one of configurations 1 to 6.

<Configuration 9> A program that causes a computer to execute: a process of setting a mode of a vehicle to one of a first mode and a second mode based on predetermined mode setting information; a process of acquiring a driving diagnosis result of the vehicle; a process of classifying the driving diagnosis result into a first diagnosis result or a second diagnosis result based on content of the driving diagnosis result; and a process of notifying a target occupant of the vehicle of information representing the driving diagnosis result when the vehicle is in the first mode, notifying the target occupant of information representing the first diagnosis result when the vehicle is in the second mode and the first diagnosis result is acquired, and notifying the target occupant of specific information instead of information representing the second diagnosis result when the vehicle is in the second mode and the second diagnosis result is acquired.

What is claimed is:

1. A vehicle notification device comprising:
a mode setting unit provided in a vehicle for setting a mode of the vehicle to one of a first mode and a second mode based on predetermined mode setting information;
an acquisition unit provided in the vehicle for acquiring a driving diagnosis result of the vehicle;
a classification unit that classifies the driving diagnosis result into a first diagnosis result or a second diagnosis result based on content of the driving diagnosis result;
a notification device provided in the vehicle for notifying, when the vehicle is in the first mode, a target occupant of the vehicle of information representing the driving diagnosis result acquired by the acquisition unit, notifying the target occupant of information representing the first diagnosis result when the vehicle is in the second mode and the acquisition unit acquires the first diagnosis result, and notifying the target occupant of specific information instead of information representing the second diagnosis result when the vehicle is in the second mode and the acquisition unit acquires the second diagnosis result; and
an occupant determination unit provided in the vehicle for determining whether there is a non-target occupant who is an occupant other than the target occupant in the vehicle based on information from a sensor provided in the vehicle, wherein the mode setting information defines that the vehicle is set to the second mode when the occupant determination unit determines that the non-target occupant is present.

2. The vehicle notification device according to claim 1, wherein when the specific information is notified by the notification device and a predetermined notification permission condition is satisfied, the notification device notifies the target occupant of the information representing the second diagnosis result.

3. The vehicle notification device according to claim 2, wherein the notification permission condition is satisfied when an input device provided in the vehicle is operated.

4. The vehicle notification device according to claim 1, wherein the mode setting information defines that the vehicle is set to the first mode when the occupant determination unit determines that the non-target occupant is not present.

5. The vehicle notification device according to claim 1, wherein the mode setting information defines that the vehicle is set to one of the first mode and the second mode when a mode changeover switch provided in the vehicle is operated.

6. A vehicle notification system comprising:
the vehicle according to claim 1; and
a wireless communication device that generates the mode setting information and that is able to wirelessly transmit the generated mode setting information to the vehicle.

7. A vehicle notification method comprising:
a step of setting a mode of a vehicle to one of a first mode and a second mode based on predetermined mode setting information;
a step of acquiring a driving diagnosis result of the vehicle;
a step of classifying the driving diagnosis result into a first diagnosis result or a second diagnosis result based on content of the driving diagnosis result;
a step of notifying a target occupant of the vehicle of information representing the driving diagnosis result when the vehicle is in the first mode, notifying the target occupant of information representing the first diagnosis result when the vehicle is in the second mode and the first diagnosis result is acquired, and notifying the target occupant of specific information instead of information representing the second diagnosis result when the vehicle is in the second mode and the second diagnosis result is acquired; and
a step of determining whether there is a non-target occupant who is an occupant other than the target occupant in the vehicle based on information from a sensor provided in the vehicle, wherein the mode setting information defines that the vehicle is set to the second mode when the occupant determination unit determines that the non-target occupant is present.

* * * * *